US010661169B1

(12) United States Patent
Saucedo

(10) Patent No.: US 10,661,169 B1
(45) Date of Patent: May 26, 2020

(54) GAME CONTENT PLAYBACK

(71) Applicant: Amazon Technologies, Inc., Reno, NV (US)

(72) Inventor: Michael Saucedo, Lake Forest, CA (US)

(73) Assignee: Amazon Technologies, Inc., Seattle, WA (US)

(*) Notice: Subject to any disclaimer, the term of this patent is extended or adjusted under 35 U.S.C. 154(b) by 55 days.

(21) Appl. No.: 15/451,182

(22) Filed: Mar. 6, 2017

(51) Int. Cl.
*A63F 13/497* (2014.01)
*A63F 13/537* (2014.01)
*A63F 13/35* (2014.01)
*A63F 13/95* (2014.01)
*A63F 13/525* (2014.01)

(52) U.S. Cl.
CPC ............ *A63F 13/497* (2014.09); *A63F 13/35* (2014.09); *A63F 13/525* (2014.09); *A63F 13/537* (2014.09); *A63F 13/95* (2014.09)

(58) Field of Classification Search
CPC .................................................... A63F 13/497
See application file for complete search history.

(56) References Cited

U.S. PATENT DOCUMENTS

| | | | |
|---|---|---|---|
| 6,699,127 B1* | 3/2004 | Lobb | A63F 13/10 463/43 |
| 9,378,237 B2* | 6/2016 | van Oortmerssen | G06F 17/30345 |
| 2004/0224741 A1* | 11/2004 | Jen | A63F 13/10 463/6 |
| 2006/0148571 A1* | 7/2006 | Hossack | A63F 13/10 463/43 |
| 2014/0113718 A1* | 4/2014 | Norman | A63F 13/12 463/31 |

* cited by examiner

*Primary Examiner* — Omkar A Deodhar
*Assistant Examiner* — Ross A Williams
(74) *Attorney, Agent, or Firm* — Hogan Lovells US LLP

(57) ABSTRACT

A gaming server can host a gaming session involving multiple players utilizing separate gaming devices. To ensure consistency across devices, the gaming server receives player-specific game data from each device then sends updated game state data to the gaming devices. Each gaming device includes a circular buffer that can contain up to a determined amount of recent game state data. If a device is to provide an instant replay, the devices can pull the state data from the circular buffer and cause the game replay to be rendered according to the timeline of the buffered game state data. Once the replay is finished, the game session resumes and new game state data is stored to the circular buffer. The gaming server can also store the game state data such that after the session the state data can be downloaded and a full replay rendered.

20 Claims, 6 Drawing Sheets

GAME CONTENT PLAYBACK

BACKGROUND

Online, multiplayer gaming is becoming ever more popular. Players can join in computer-hosted games using personal devices from various locations. During gameplay there may be an occurrence that has some level of significance that the players may want to re-watch, or be able to view as the occurrence may have been outside a field of view rendered for a particular player. Often the replay of a game involves the playback of audio and/or video captured during the game. Such playback offers limited flexibility, and can be resource intensive in at least some environments.

BRIEF DESCRIPTION OF THE DRAWINGS

Various embodiments in accordance with the present disclosure will be described with reference to the drawings, in which.

DETAILED DESCRIPTION

Figure 1:
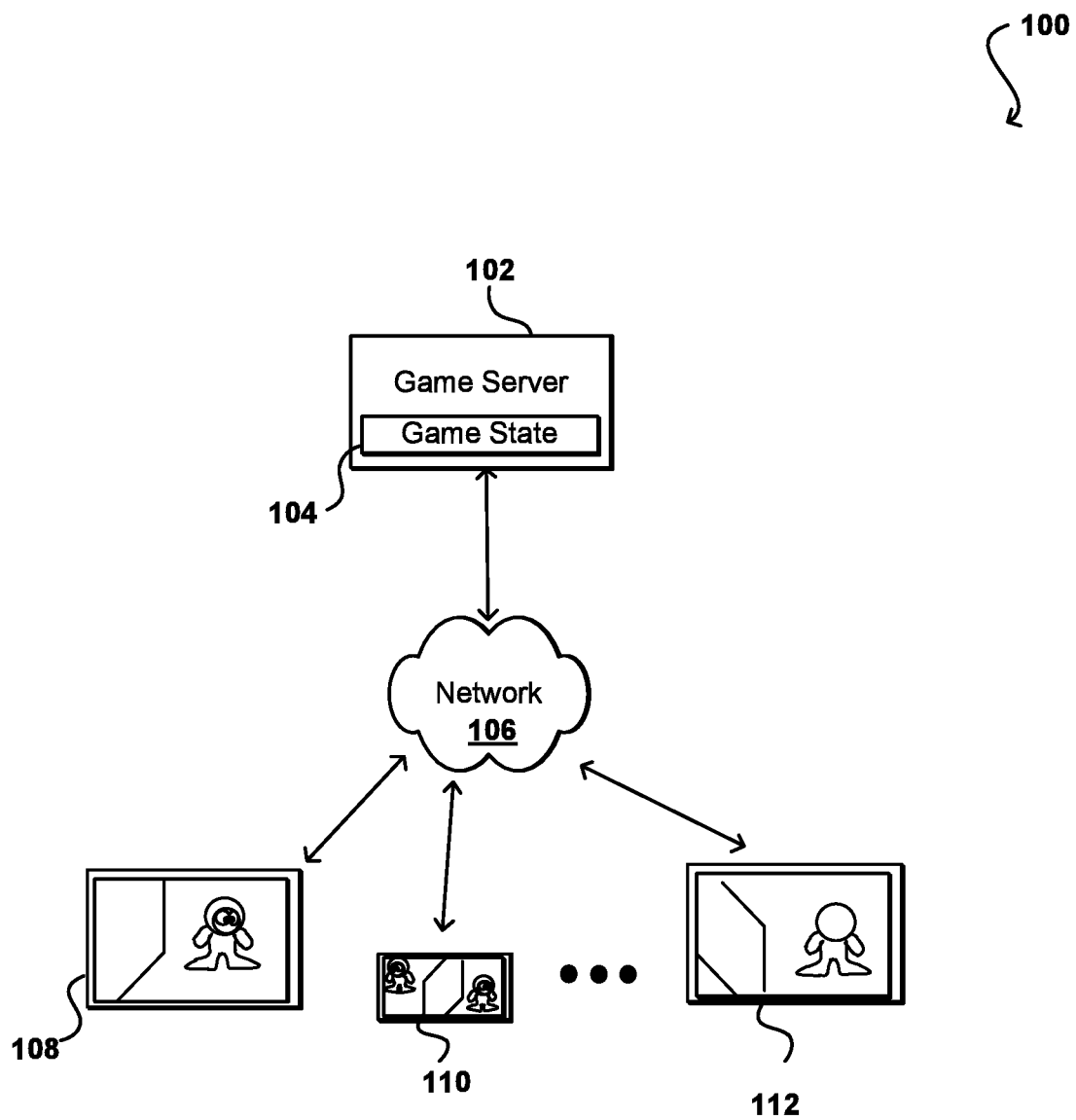
FIG. 1 illustrates an example environment in which aspects of the various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the processing of gaming content on a computing device. In particular, various embodiments provide for the replay of multiplayer gaming content on a client gaming device. A gaming server can host a gaming session that involves multiple players, who may each utilize a separate gaming device at a different location. In order to enable the game session to be consistent across all devices, the gaming server can receive player-specific game data from each device executing the game, where the player-specific game data can relate to actions performed by the user on the respective device. The game data can be processed and aggregated as appropriate, then sent to the gaming devices in order to enable the game session to be consistent across all devices. Each gaming device can include a circular buffer contains up to a determined amount of recent game state data, such as for the last ten seconds of gameplay or a comparable number of frames. If one or all of the devices is to provide an instant replay, such as in response to an occurrence in the game or a request by a player or the game server, then each device can pull the state data from the circular buffer and cause the game to be rendered and displayed according to the timeline of the game state data from the buffers. Such an approach enables the replay to be rendered from different points of view, as may be programmed or adjustable by the players. Once the replay is finished, the game session can resume and new game state can be data stored to the circular buffer. The gaming server can also store the game state data for a session such that after the session the state data can be downloaded and a full replay rendered according to the saved state data. The full replay can allow greater flexibility of views and replay than the device-specific instant replay in at least some embodiments.

Various other such functions can be used as well within the scope of the various embodiments as would be apparent to one of ordinary skill in the art in light of the teachings and suggestions contained herein.

As mentioned, online gaming can enable multiple players to compete in a single session of a game using different devices, which can be operated from different locations. Oftentimes there will be an event or occurrence in the game, such as the capturing of a target or completion of a task, that may be desirable to be replayed for any or all of the players. This may be due to the importance of the task to the purpose of the game, but may also be due to the fact that each player's view of the game is generally dependent at least in part upon a point of view (POV) of that player during the game. During first or third person gaming, for example, this can include a camera that is at or behind a character's head and pointing in the direction of their head or view direction. The field of view can also be dependent upon factors such as zoom level, first vs. third person gaming, and other such aspects. It might be the case that a player did not obtain a view of the occurrence in the game as the occurrence may have happened outside the player's POV (or field of view FOV) at that point during the game. In other situations it may be preferable to provide alternative views of the occurrence, such as may include overhead or sweeping views that not only provide potentially a wider or more focused view, but can also provide for a more cinematic experience for important occurrences in a game. There may be various other advantages to showing alternative views of important tasks in a game as well.

Using current approaches, however, such options may be somewhat limited. For example, video and audio may be captured for playback, but the video and audio would generally correspond to the field of view of one of the player's or a general game FOV. In some systems the replay can be generated on one or more of the gaming servers, and transmitted to the individual devices, but such an approach can be relatively bandwidth intensive, particularly for high resolution gaming, which can be undesirable for mobile devices and other gaming systems that may have limited or expensive data plans.

Accordingly, approaches in accordance with various embodiments can attempt to provide improved replay systems that can be utilized for various types of computer-based gaming and other such applications. FIG. 1 illustrates an example system implementation 100 that can be utilized to provide such replays in accordance with various embodiments. For a gaming application, there can be one or more game servers 102 that can execute the game, or at least manage game state for instances of the game executing on various user devices 108, 110, 112. These devices can include specific gaming devices, such as gaming consoles or handheld consoles, or other computing devices such as smart phones, tablet computers, wearable computers (e.g., smart glasses or watches), desktop or notebook computers, and the like. The devices can communicate with the gaming server 102 over at least one network, such as the Internet, a cellular network, a dedicated gaming network, or a peer-to-peer network, among other such options, such that the gaming server 102 can maintain the state for each player in a particular gaming session. State information can be transmitted to the gaming server 102 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

As part of the game offering, any or all of the user devices 108, 110, 112 may have the ability to obtain a replay of a certain portion or period of the game session. In one embodiment, a game-state recording and playback system utilizes software that executes on both the gaming server(s) 102 and user devices 108, 110, 112 to capture game state and other metadata, which in at least some embodiments can be user-definable. The state data and other game metadata can be used to provide gaming playback at a later time, such as may be part of an instant replay of a recent occurrence or playback at a later time of an event that occurred during a gaming session. An advantage of such an approach over conventional approaches is that no game engine or game code is required to be deterministic in order to provide for proper recording and playback. The software can instead record information such as transforms for all relevant gaming entities, skeletal bone poses, sound effects (sfx), visual effects (vfx), game-specific events (as may be user interface (UI) or head's-up display (HUD) related) using quantization, for example. This information can then be used to provide playback of that gaming period using, for example, interpolation. The ability to generate the playback dynamically allows for options such as different fields or points of view, sweeping cameras, and the like. Other features can be provided as well, as may include speed-up or slow-down of playback, scrubbing, pause, and sectional file input/output (I/O) streaming from a cloud storage location, among other such options.

Figure 2:
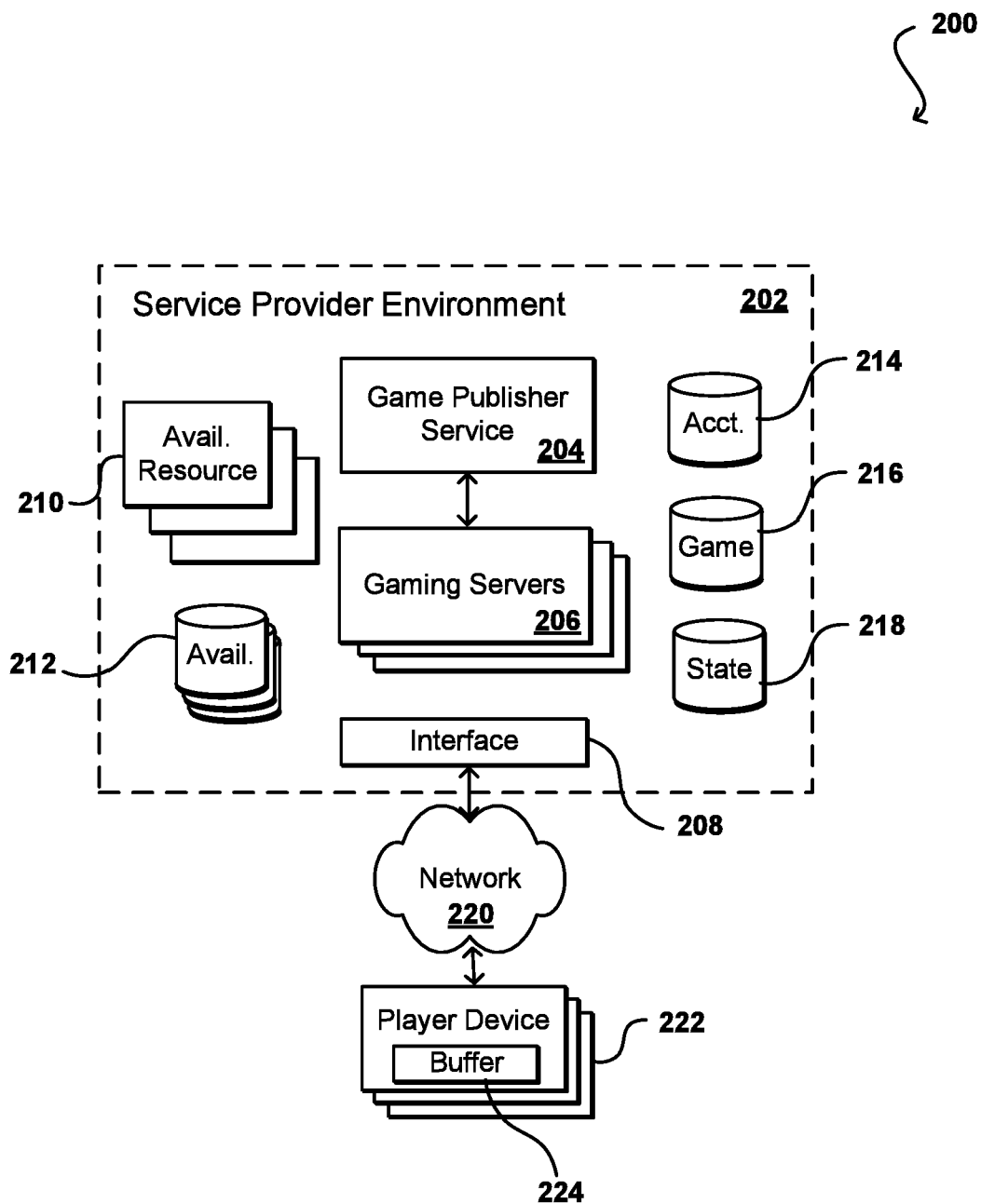
FIG. 2 illustrates an example game management service that can be utilized to provide gaming content in accordance with various embodiments.

FIG. 2 illustrates an example gaming system environment 200 in which aspects of the various embodiments can be implemented. In this example, a gaming provider utilizes resources of a service provider environment 202 to operate aspects of a gaming service. A service provider can provide various resources (e.g., computing and data resources) that can be utilized by the gaming provider, where the provider can pay for the resources utilized without having to manage those resources. The service provider environment 202 can include any appropriate components for receiving requests and returning information or performing actions in response to those requests. As an example, the service provider environment 202 may include various types of electronic resources that can be utilized by multiple users for a variety of different purposes. In at least some embodiments, all or a portion of a given resource, or set of resources, might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 210 of one or more types. These types can include, for example, application servers operable to process instructions provided by a user or database servers operable to process data stored in one or more data stores 212 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a portion of the resources 210 can be allocated in response to receiving a request to an interface layer 208 of the service provider environment 202. The interface layer can include application programming interfaces (APIs) or other exposed interfaces enabling a user to submit requests to the service provider environment. The interface layer 208 in this example can also include other components as well, such as at least one Web server, routing components, load balancers, and the like. When a request to provision a resource is received, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment and/or to a client device, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

A resource manager (or another such system or service) can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In this example, at least some of the resources are used to support platforms and services useful in the development, providing, and management of electronic gaming and three-dimensional graphical content, among other such options. Gaming content can be obtained and published by a publisher service 104, for example, which can utilize information from one or more account repositories 214 to ensure that any recipient of the gaming content has an appropriate account or other authorization to receive the content. The game publisher service 204 can store information in one or more game repositories 216, where the repositories can include graphics files, code, audio files, and the like. When publishing the game content to a gaming server 206, for example, a game publisher 204 can provide the content directly or provide access to the gaming content from a gaming repository 216, among other such options.

Once the game development reaches an appropriate stage in the development cycle or pipeline, as may relate to alpha or beta testing, actual release or updating, etc., the appropriate content can be made accessible to the game publisher service 204. The game publisher service 204 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines, player machines, or otherwise. In some embodiments the game content might be published and made available to one or more test machines, which may be associated with the customer, such that the customer can test various builds or versions of the game. In some embodiments feedback provided by the test machines may be provided to a game development service, which can maintain testing feedback or data and make that feedback available, via logs, messages, reports, or other such mechanisms, to the developers or other persons associated with the game development. If the game is to be made available to end users, gamers, or other such persons or entities, the game publisher service 204 might publish the game content to a set of gaming servers 206 which can execute the game and enable player machines 222 to access the game content over one or more networks 220. The network(s) can include, for example, dedicated gaming networks, the Internet, cellular networks, and the like. The player machines 222 can communicate with the appropriate interfaces of an interface layer 208 to obtain the gaming content. In some embodiments the player machines 222 will download the gaming content for execution on the individual machines, and will upload (or otherwise communicate) gaming data, messages, and other information to the gaming servers 206, as well as to other players, social networking sites, or other such recipients. The gaming servers 206 can cause state information for the various instances of the game to be stored to at least one game state repository 218. This can hold state for the game as a whole or for individual game sessions, among other such options. In some embodiments there can be multiple players for an individual session, and the state information for the session can include state, metadata, or other information for any or all players on the session. In some embodiments the game content can be executed by the game servers and streamed in near real time to the player machines 222. In some embodiments there may alternatively be a mix of gaming content executed on the player machines and the gaming servers. Peer-to-peer connections among the player machines 222 and other communications can be utilized as well in various embodiments.

In one embodiment, a gaming server 206 can store the game state data for all players and/or gaming devices 222 for a session. The gaming server can store state information as if the server is hosting the game, and can be authoritative. All gaming clients can work with the gaming server, which can act as an arbitrator that can manage the execution of the game. The gaming server can thus have access to all the stored game state data, which in one embodiment is stored locally by the gaming server during game session then later stored to a game repository 216 or remote persistent storage, among other such options. Once stored to a game repository 216, for example, any of the gaming clients 222 or other authorized users or devices can obtain the state data and cause that game session to be replayed on an appropriate device. The state data can be obtained by a gaming client 222, for example, and a replay generated on the client device. The user can have at least some control over the playback, as may relate to the camera angle, field of view, playback speed, pause, rewind, and the like. The player can also perform actions such as recording a portion of the playback for sharing via one or more social media sites. In at least some embodiments, the full replays are provided after the gaming session or match, by one of the gaming servers, which can then be viewed offline, or not during real-time network play on the session.

In one embodiment a multi-player session is executed or managed by a single server that is temporarily dedicated to that session, which can record all pertinent game data needed for full replay playback. The data can be constantly buffered and incrementally saved to a file local to the server 206, in this case with in the service provider environment 202. At the end of the match or session, the gaming server 206 can post-process the recorded data. The server can also initiate a separate application or module to upload the file of recorded gaming data to the gaming repository 216. The gaming server 206 is not blocked, except upon shutdown, and is free to continuing hosting more matches or instances of the game. The gaming server 206 is only allowed to shut down in some embodiments when no spawned uploading process remains to be performed or completed. There is no replay related server-client communication done during a match or session in this example.

The post-processing of the replay file can involve relocating a footer section of the file to a header section, which enables the header to contain metadata about the match. The metadata can include mandatory information such as a scrub-spawn table and versioning information. The metadata can include other information as well, as may relate to the sampling rate, full frame injection interval time, and the like. The relocation of information from footer to header can provide for simpler retrieval of the metadata in at least some embodiments. The gaming server 206 can also send each participating client of the match a replay key that can subsequently be used to stream the replay on an appropriate client. After receiving a key corresponding to the match, a client can use an appropriate interface to provide the key and enable the content to be streamed or otherwise transmitted to the relevant client. During the recording process, the player devices 222 will incur no extra performance penalty as the devices are not responsible for any of the replay processing When obtaining the replay data, a player device 222 can start streaming the full game replay to a local drive or other such storage. Once the device obtains the header information an offline game mode can be initialized that is suitable for playing back a replay. The client device can also determine how to process the game data using the metadata information, such as may relate to memory mapping or discarding information after processing, etc. A plurality of options can be presented to the user for controlling playback on the client, as may relate to scrubbing and playback speed, among other such options. The metadata can include other information as well, as may relate to versioning, map names, sampling rate, class name table, and the like.

In one embodiment there are two types of recording of a spawn event for entities, where the information can be embedded in a stream or entered in a spawn-scrub table. When embedded in a stream, the information needed for spawning an entity is captured in the stream data alone. In such an approach, an entity can only determine how to spawn an entity through natural playback of the stream data, in a forward pace. When it is desired to playback in other than the natural flow, the spawn-scrub table can be used to enable the arbitrary jumping around in the replay using scrubbing or another such approach. Spawn-scrub tables can grow very quickly, so the extra spawn information can be determined by game code listening on spawn messages for replay entities. By default, entities may not generate spawn-scrub entries, although these entities may have at least a spawn time entry and potentially a die time entry. There can be one entry in the table for each spawn and/or die entry for an entity, where appropriate.

In one example replay approach, three types of frames are utilized, including game frames captured at 60 Hz, delta frames set at 10 Hz but adjustable, and full frames set at 0.033 Hz but adjustable. Game frames can correspond to every frame that occurred on the server at the time of recording. This can include all game frames, every 60th of a second. Delta frames can occur at some smaller frame rate, such as 10 Hz. Full frames can occur at even smaller frame rates. The set of all game frames can include the set of all delta frames, and the set of all full frames, but the reverse is not true. The stream can be composed of blocks of data, where each block can indicate an amount of payload. On every full frame type interval it can be guaranteed in some embodiments to find entity and particle positional data in the stream. On every delta frame type there may be entity and particle delta positional data. Game frame types may only include spawn, kill, visibility, or other such events.

In other embodiments, however, instant replay functionality can be provided that may not involve a gaming server 206 in the process. In such an approach, the game state information can be recorded and captured by each player device 222 during the game session. Each client can have the full game simulation executing on the respective device 222 as the server 206 is sending game state information across the network 220, as the device will need to obtain information for player actions on other player devices 222. Obtaining this state data with the full simulation will enable the game session to be reproduced on the respective device 222. Each player device 222 can record the entity game states, visual effects, and other information on the local device, such as in a game buffer 224 stored in memory on the respective player device 222. In one embodiment a player device 222 uses the buffer 224 as a circular buffer that stores state data for the last ten seconds of gameplay on the session, although other time periods can be used and the time period can be adjustable as well within the scope of the various embodiments. At any point during the session, the player device 222 (or gaming application executing on the device) can determine to pause live gameplay (i.e., the real game simulation) and provide playback of the state stored in the replay buffer 224. In one embodiment the current game entities are hidden and the replay entities are spawned and made visible in order to provide replay of the last ten seconds of the game session. At the end of the replay that data can be discarded, unless a player otherwise indicates to save that replay, and the recording and live game simulation resumes. The hidden entities (or particles, etc.) can have a flag set that can help to identify these entities for resuming display at the end of the replay.

In one embodiment, a single game server 206 can be authoritative for a game session with respect to the devices 222 used by players involved in the session. The server hosts all players on the session, and manages state information for that gaming session. Each player device 222, however, will record game state data locally in their own circular buffer 224 that can be used by the respective devices to generate instant replays. The devices 222 can receive state data from the authoritative server 206 that corresponds to other player actions, etc., but the player device will use only information from the respective buffer 224, without sending a request for additional information, in order to generate an instant replay in at least one embodiment. In some instances an event may occur for which all devices should provide an instant replay, but in this example the gaming server 206 would send a request to each player device 222, which can each then pull the information from their circular buffer 224 for rendering a local view of the instant replay for the event.

In some embodiments a player device 222 entering an instant replay mode will send information to the gaming server 206 indicating that the device is entering the replay mode. For a situation where all players are to view the replay, the server can wait until all devices have responded and can enable the devices to view the replay synchronously, such that the gaming session can resume at the same time for all players after completion of the replay. In other situations the player device 222 can provide this information to the server 206 so that the server can determine that a lack of gaming data received from that device over a period of time will be due to the replay mode and not due to an error or termination, for example. For synchronous replay, all devices can use the state information from their local buffers to generate the replay. Since a single server is managing the state information then all devices should have the same state information for playback. It is possible, however, that the precise amount of data in the buffer might vary slightly such that the exact timing of the start and stop points for the replay may vary between devices. Each device can provide playback using the game state data in the local buffer, and can then send a signal to the game server 206 that the replay has completed, such that the live game session can resume. Once all player devices on the session have finished replay, or another such criteria is met, the gameplay can resume and recording of game state data can start over from the point of the replay. In some embodiments devices can communicate with each other to provide peer-to-peer communications, but in this example all game-related state information passes through the gaming server 206 such that the gaming server can have a complete copy of the state data and can ensure that all relevant devices have access to that data.

When a player device 222 is to provide an instant replay, the device can obtain the request or signal from the respective game server 206. In response to the request, the player device (or gaming application executing on the device) can hide all game entities for the live session, instead of pausing or reusing the entities as in other embodiments. Hiding the entities instead of pausing or reusing them enables the replay to be performed without affecting network communications for the gaming devices. If the position information was updated as the replay dictates and information shared, there is a potential that the server could broadcast the update information to the other client devices which could cause issues with the game. Once the game entities are hidden, the devices can spawn new entities for the replay, get the appropriate position and pose data, and then perform the transforms or animations as indicated by the state data. For game data generated and stored at a full frame rate, such as 60 Hz, the replay can be rendered and displayed at that full frame rate as well, although other options can be available in other embodiments as well, such as may allow for fast forward or slow motion replays, among other such options. The replay can also accept new data for use in rendering the point or field of view, as may be provided by the application, the gaming server, or a player using one or more camera controls, etc. The replay can take full advantage of game state data such as visual effect spawn markers and others discussed and suggested herein. The replay can follow the timeline of the state data in the circular history buffer on a device. Once the playback reaches the end of the history buffer, the replay entities can be killed or deleted, and the regular game play entities can be made visible again. The normal game simulation or session can then resume from where the entities were last located on the session. The instant replay thus can look identical to the live game, other than being able to change the point of view and other such aspects. Once the replay has completed the game will then resume precisely where the game left off at the time of the replay.

In some embodiments the type of game state data that is captured and used for replays can vary. For example, some approaches discussed herein utilize bone poses while others utilize animation states. For an animation state, an animation layer identifier can be captured in a manner similar to that being used to capture visual effects spawn markers. The identifiers can be encountered in a game stream and then rendered accordingly. The animation can then play out until it is updated with a new or alternative animation. In order to provide such functionality the software needs to capture appropriate game state for all relevant elements, but for multiplayer games much of this is captured already to ensure a consistent gaming experience across devices.

The circular history buffer 224 can be of fixed or variable length. In some embodiments the buffer can store data captured over a fixed period of time but enable the number of frames of data to vary, while in other embodiments the buffer might store data for a fixed number of frames but enable the time period to vary. The period can be set by the user or the game provider, among other such options, or in some embodiments can be set dynamically based upon factors such as available memory, graphics settings, and the like. The settings can make a difference as some users may run games at lower frame rates than others, based upon the capabilities of the devices used to render the game, personal preference, or other such options.

Various other types of information can be recorded for a game session as well, that can then be utilized during a replay. For example, a game might include various hooks that enable the injection of data to be included in the replay stream. In one embodiment a unique tag can be applied to anything to be included in a replay. The developer or gamer can then include any appropriate payload data following the tag for inclusion in the replay stream. The information can be any appropriate information, such as player statistics, player comments, player-specific visuals, and the like. The information saved can be packed or quantized, if desired, or stored in an uncompressed state, among other such options.

There may be limits placed on the amount of additional information, however, as may be a factor of the size of the buffer or other such aspects. For full replays this information can be pulled from the server in some embodiments, while for instant replays the information will be stored in the local ring buffers on the player devices.

As mentioned, in some instances the playback may need to utilize some amount of interpolation for the display. This may result from dropped frames or incomplete information, but can also result from playback at different frame rates than capture, among other such possibilities. There can be some amount of interpolation of bone poses, visual effects, and other elements between sample frames in order to provide the desired playback. In some embodiments delta information can be stored that indicates how information changes between frames, or snap shots, which can then be encoded by a delta bit marshaller or other such service. Since client devices typically will only have limited space in the circular buffer, there will only be a small time window of the most recent action available immediately for instant replay, without pulling information from the server, so the ability to provide delta information can help to provide the maximum amount of information from this limited amount of storage. A game server can still store information for full offline replays, but instant replays can be managed on the devices themselves to minimize the additional cost and overhead utilized to provide the full replays. Compared to full replays, instant replays in some embodiments will have no file caching, no data transmission, no scrubbing, and full frame type sample types. Instant replays in other embodiments an utilize a file queue-buffer, instead of an in-memory buffer, and can support scrubbing and delta frames, at least up to a specified size.

In some embodiments the state data that is stored can include non-delta, quantized transform data. This can include, for example, two bytes of data for each x, y, and z translation, and one byte for each rotational Euler x, y, and z. Such an approach can work on an assumption that entity scale can be neglected for purposes of the replay. Such an approach would utilize a total of nine bytes per entity for the transform, not counting bone poses. Bone pose data can utilize a similar nine bytes per bone transform. Such an approach may not work for all applications, however, as each player character can have bone counts in the hundreds, such that the frame data size can explode rapidly. The state data can also include information for spawn and die events for both entities and particles, and can include audio sfx cues as well. Entity and particle transformational data can be recorded for every frame, and spawn events recorded as they occur. In at least one embodiment the transformational data can go into the queue buffer stream, with spawn event data going into the spawn metadata table.

In one embodiment a new history buffer class is utilized for the instant replays. The buffer class can facilitate storing frame data in a first in, first out (FIFO) manner, while determining when to start removing things from the queue based on elapsed time, as opposed to container size or another such metric. Such an approach can be advantageous because the number of elements will not be known ahead of time since frame rate is variable and its decided the time history window size is fixed. For example, ten seconds of data for a fixed time history window at fifty frames per second will yield 500 frames, and thus 500 entries in the queue buffer. The internal peak capacity of queue buffer can be monitored through logs and care taken if the peak grows too large.

As mentioned, a dedicated metadata table, such as a spawn and die time table, can be used to hold data for each entity or particle. Each entry can include information such as an identifier, a spawn frame time stamp, a death frame time stamp where applicable, and a type of entity tag (e.g., particle or entity). The data for an entity can also store information such as the entity class name, spawn parameters, and visibility state. The data for a particle can store information such as the particle effect name, spawn parameters, and active state, among other such options. A set of alive or active entities and particles can be maintained throughout the life of the playback. Playback itself can consist of a number of different tasks, including pause or playback recording, and the like.

Figure 3:
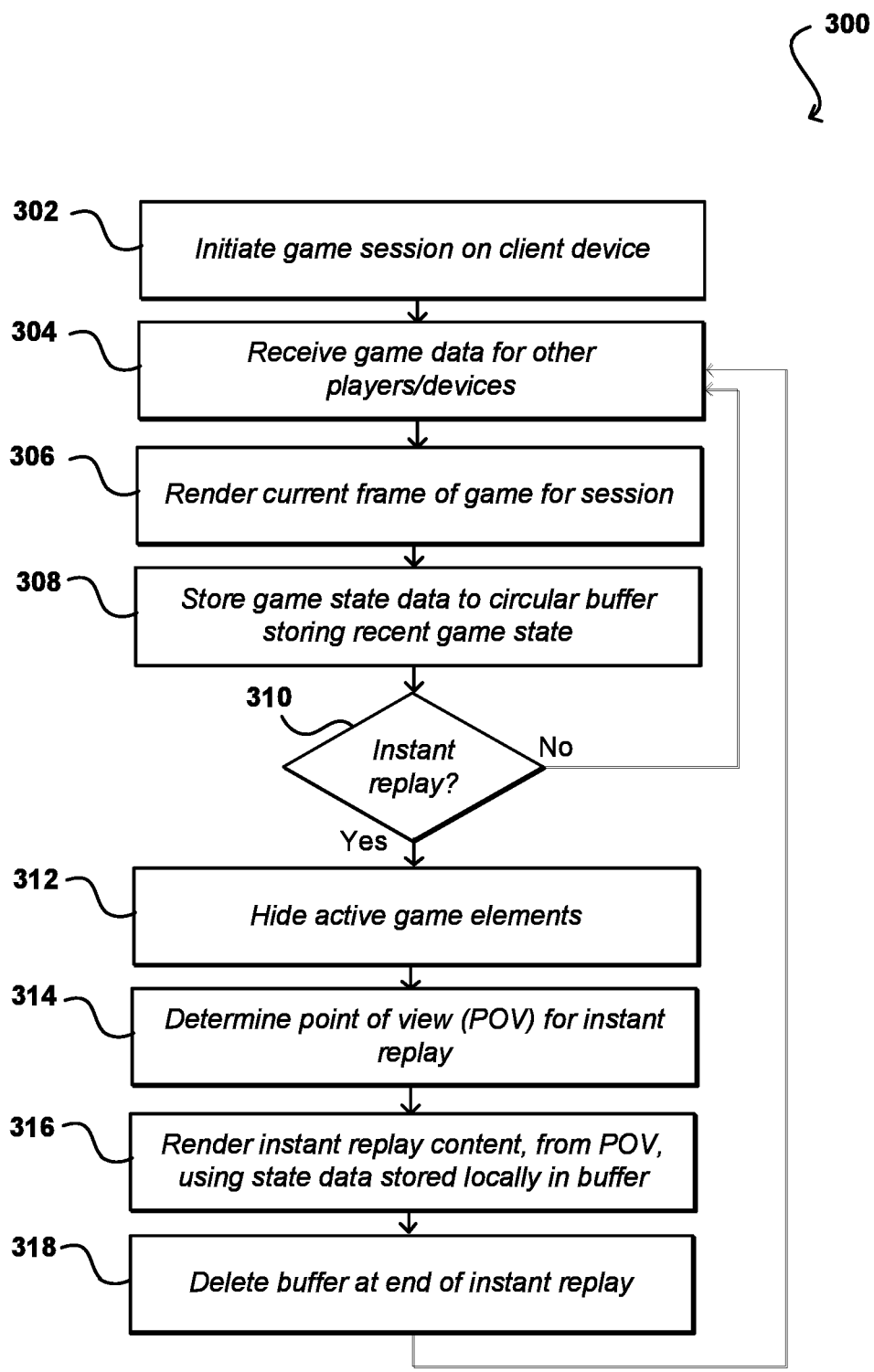
FIG. 3 illustrates an example process for providing an instant replay on a client gaming device that can be utilized in accordance with various embodiments.

FIG. 3 illustrates an example process 300 for providing an instant replay on a player gaming device that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, the steps of the process are performed by a client gaming device, such as a computing device executing a gaming application. As part of the multiplayer game, the process can be performed concurrently by multiple gaming devices operated by different players for a game session managed by one or more gaming servers, among other such configurations. In this example a game session is initiated 302 on a client device, where that session is part of a larger multiplayer game session managed by a respective game server. As part of the session, the client device can receive 304 game data for other players or devices for the session. This can include, for example, location and position data for other players in the game session, as well as the impact of those players on the overall state of the game. Various other type of information can be received as well as discussed and suggested herein. The received information can be used, along with the information from the instance of the game running locally on the client gaming device, to render 306 a current frame of game content. As known for such purposes there generally will be a frame rate for the device at which the game content will be rendered, and each frame of content will depend upon the game state data as well as a point of view and field of view of a virtual camera for the device, among other such factors.

In addition to rendering the frames of game content, the game state data can be stored 308 to a circular buffer in memory on the client gaming device. Other types of storage and buffer or cache can be used as well within the scope of the various embodiments. As mentioned, the gate state data can include information such as bone pose, translation, visual effects, sound effects, game element and particle data, and the like. The state data can be stored to the buffer in a first-in, first-out manner, for example, where state data can be stored up to a capacity of the buffer, such as up to ten seconds or a designated number of frames. Once the buffer is full, the oldest state data will be pushed from the buffer to allow more recent state data to be stored.

During the gameplay it can be determined 310 that an instant replay instruction was received or initiated. As mentioned, this could be an instruction sent to all client gaming devices by a gaming server for the session or a request initiated by one of the players, among other such options. For an instant replay to be displayed on a client gaming device in this example, the state data that is buffered should be used to generate the replay without need to contact the gaming server or otherwise obtain state data or gaming content from a remote source. In this process the active game elements are hidden 312, instead of pausing or reusing the elements for the replay. A point of view (POV) can be determined 314 for the instant replay, as may be based upon a user control or selection, an instruction from the gaming server, or a function executing as part of the gaming application on the device, among other such options. The point of view can be a single point of view, or can follow a determined pattern, including various zoom levels or other changes as discussed herein. Once determined, the instant replay content can be rendered 316 using that point of view and the state data pulled from the local circular buffer. The user can, in some embodiments, have options for modifying the playback. Absent such input, the instant replay will playback in order according to the buffered state data, until the end of the playback state data is reached. At this point, the game elements can be restored or placed back to visible and the game can resume from its prior state. The data in the buffer can be deleted 318 with new game state data being recorded so new instant replays will be available for the game session. In some embodiments the buffer may not be deleted but instead new state data added per the determined FIFO approach. As mentioned, in some embodiments a player may also have the ability to cause additional state data or information to be stored for the game, which can be incorporated into the instant replays.

Figure 4:
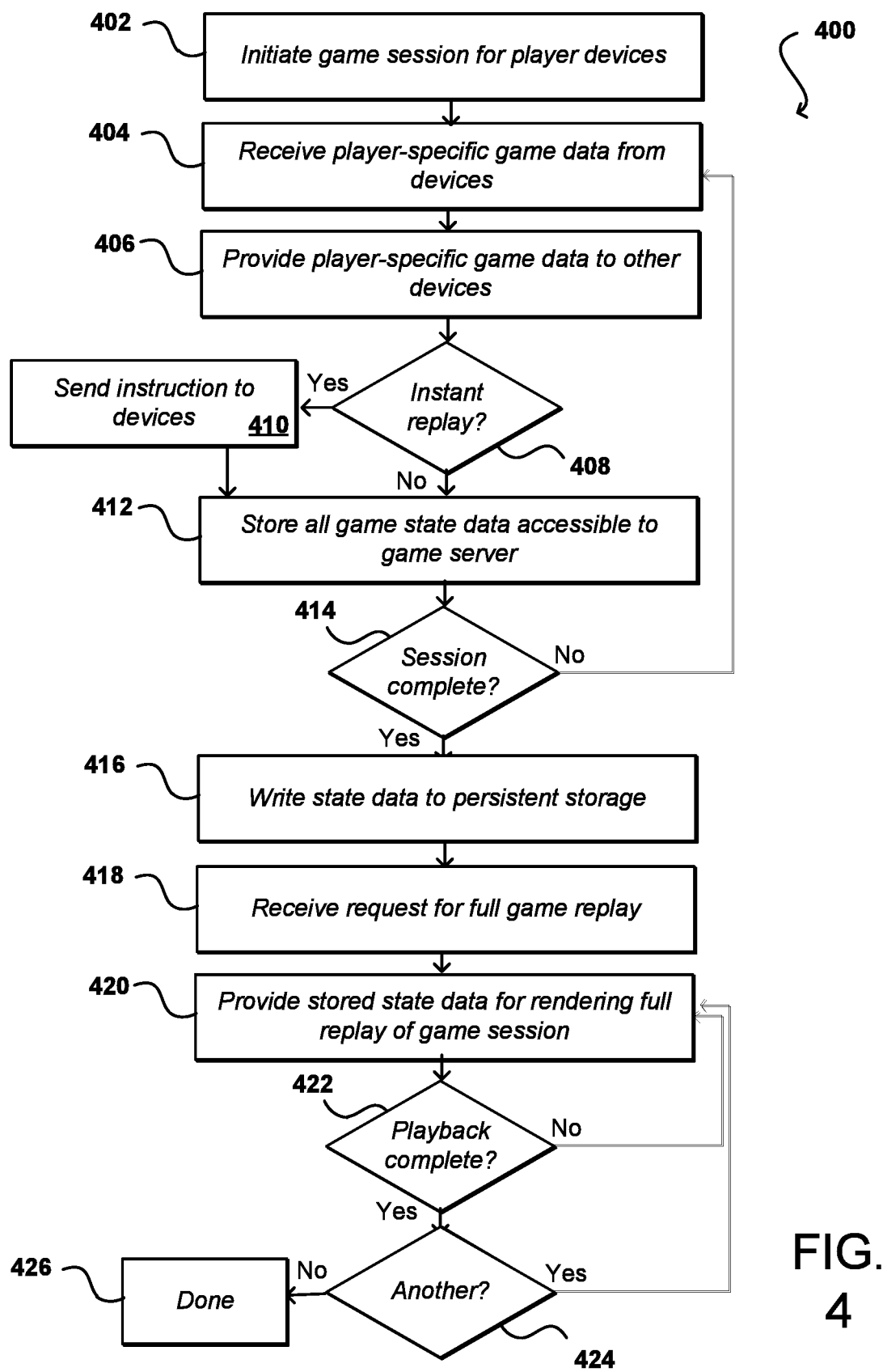
FIG. 4 illustrates an example process for managing gaming state data for a plurality of gaming devices that can be utilized in accordance with various embodiments.

FIG. 4 illustrates an example process 400 for managing game state for a set of player devices that can be utilized in accordance with various embodiments. In this example, the steps of the process can be performed by a single game server, or other such device, system, or service. A game session will be initiated 402 for multiple player devices, or client gaming devices, where those devices may be awaiting the session initiation or able to subsequently join in the session. Once initiated, player-specific game data can be received 404 from the various devices and used to determine the current state of the game for this session. The player-specific game data, and any other relevant game data, can be provided 406 to the various client gaming devices in order for each device to have all current state data for the game. If an instant replay is determined 408 to be provided on any or all of the devices, such as may be initiated by the gaming server or any of the individual devices or gaming instances, then an instruction can be sent 410 to the devices to utilize the locally stored state data to generate an instant replay. As mentioned elsewhere herein, various embodiments enable instant replays to be rendered on the devices without the gaming server needing to provide any of the data for the replays.

In addition to providing state data to the individual client gaming devices, the gaming server can store 412 the game state data in a location that is accessible to the game server, whether in memory on the server or otherwise. A determination can be made 414 as to when the session is complete. Once complete, the state data can be written 416 to persistent storage, such as to network-attached disk storage. When a request for a game replay is subsequently received 418 from an authorized entity, such as one of the players to the game session, the stored state data can be provided 420 to enable rendering of the full replay of the game session. Such an approach can provide more flexibility and a longer replay than the device-generated instant replays, but can require additional bandwidth and resources to generate and provide in at least some embodiments. Until it is determined 422 that playback is complete, due to reaching the end of the replay or a stop action, for example, the providing of state data and/or playback can continue. If playback has completed, or all state data has been provided, then a determination can be made 424 as to whether another playback is to be provided. If so, the process can continue for another replay. If not, the process can complete 426.

In some embodiments, bit marshaling can be used with gameplay data such as entity and particle transforms, as well as entity bone pose transforms. Such marshaling can be used for player statistics and other gameplay aspects as well. A delta bit marshaller can be used for packaging integral data and preparing the data for compact storage (disk serialization) or network submission. When preparing data for marshalling, approaches in accordance with various embodiments can attempt to utilize as few resources as possible in terms of memory space, network bandwidth, and disk storage, among other such aspects. A delta bit marshaller can enable a developer to express the integral delta change of some piece of data of an object between two given time points with as little as two bits of storage or less. In one embodiment the compression offered is two bits, and worst case is two more than the number of bits needed to represent the full integral value naturally. The developer can determine which of the marshalled data will benefit the most from the compression scheme.

The inputs into the a delta bit marshaller algorithm in one embodiment include a set of integers declared by, and passed from, some external source, such as a file or API, along with bit size capacities for each integer specifying number bits needed for raw full-value space, and number of bits for delta-value space (allowed to be 0). An output of the algorithm in one embodiment is the compression stream, which in at least one embodiment is an array of bytes. The term "compression" as used herein refers to whether delta packing is used, versus non-delta, full data packing, throughout the stream. The process of generating the output stream is also known as marshalling. One delta bit marshaller record or instance is declared by the input set, which specifies the set of integers needing to be marshaled, along with their bit usage info. This bit usage information can correspond to the number of bits needed for non-delta storage, as well as delta storage, per integral.

There can be two distinctive modes an example delta bit marshaller algorithm can operate in: full mode which involves strictly full data mode, never attempting to compute deltas, and delta mode, which involves always attempting to compute deltas. Full mode can disallow the delta portion of the algorithm to execute. All integral values found in the stream can be considered to be discrete in at least one embodiment. Bit packing can still be utilized with the delta ability turned off. Contrastingly, delta mode allows values to either be discrete or not, in addition to bit packing. In the case of a not discrete value, the final data point of a given marshalling output can be dependent on the output of the final data point for the previous marshalling.

For any given integral data, up to 64 bits in length, two extra bits can be used needed to encode the type of compression used. These can be referred to as the control bits. The control bits can physically hold four distinct values in one embodiment, only three of which are valid. The fourth value can be deemed to be invalid and can be used to verify that indeed what follows is more valid delta bit marshaller compression stream. The valid values in one embodiment include:

0x0=no data present
0x1=full integral data is present
0x2=delta integral data is present If a value of 0x3 is found, the stream can be considered invalid and processing can stop. It is also possible for the stream to contain invalid data even without a 0x3 marker, there may be no way for the delta bit marshaller to determine the marker at this point.

There can be two "write heads" when the delta bit marshaller algorithm performs marshalling. One head is for the control bits, and the other head is for the payload. This effectively creates two different sections within the stream, including control and payload sections. At the start of marshalling, the entire stream is has no length and both heads point at the beginning of their respective sections of the stream, the control bit section and payload section. For each integral entry, the control bits value is computed for this entry, and if the control value is non-0x0 then payload data will be written out for this entry and the payload write head advanced. The control bits write head can be advanced by two bits after every processing of each integral in at least one embodiment. This can create a constant size control bits section that can be pre-computed by taking the number of integral entries and multiplying by a factor of two. The size of the payload section is variable and can be determined by traversing the control bits and counting the corresponding bit size entry (for full or delta) for that corresponding integral. There is no blank space between the two sections in at least one embodiment. Waste can occur at the end of the final resultant payload section. When all integrals have been processed, the stream is complete.

For each integral entry in the record, the delta bit marshaller can internally hold pointers to the previous integral value and the next integral value as provided by the user. When the delta bit marshaller record is told to perform the marshalling operation, for each integral entry, it can compute the difference between the two values. If the resultant difference is found to be representable by the number of delta bits (as specified by the user at the time of delta bit marshaller creation, then a 0x2 value can be written into the control bits for this integral entry. If it cannot be represented properly, then a 0x1 is written. In the best case scenario of there being no difference between the values, a 0x0 value can be written. In no case is a 0x3 written in this embodiment. After processing this integral entry, and if the data was delta data, the value at the "previous value" slot is updated with the "next value" which is full data (not a delta). In the next call to marshalling a valid delta can then be computed. If this step was omitted, a delta could potentially be generated every call, rather than when the value is actually different from the previous call.

The unmarshalling of the delta bit marshaller can require, in at least one embodiment, that there is the same delta bit marshaller record definition used as when marshalling occurred. Once this is given, unmarshalling can proceed. Two "read heads" can be created, with the control bits read head pointed to start of the control section, and the payload read head pointed to the start of the payload section (computed as simply the length in bits of the control section). Control bits are read in and depending on the value, the payload read head knows how many bits to read from the payload. Nothing in the stream signifies the end of the stream in this embodiment. The algorithm knows to stop unmarshalling because it has finished processing all of the integrals that were declared as inputs. Similarly as for marshalling, the unmarshalling algorithm modifies the "previous value" slot with the newly read data from the payload, after converting it to full data first (not delta). This is so the next call to unmarshal will correctly apply deltas to user data if they are found in the payload section.

In one example, a programmer may intend to marshal a game entity's transform data. The time interval desired is one game frame. A game entity's transform, in raw terms, is defined as:
  96 bits=3-floats (4-bytes each) of position data
  96 bits=3-floats (4-bytes each) of rotational (Euler) data
  =192 bits total The total is thus 192 bits, or 24 bytes, used to store the transform for one frame in raw bit space. A first step in preparing this data for the delta bit marshaller in one embodiment involves transforming the float data to integral data. It is not in the scope of the delta bit marshaller to do this conversion. Assuming the programmer manages to do this conversion, the new bits can be determined that are to be used to store the quantized float data, given by:
  48 bits=3-shorts (2-bytes each, half-sized quantized floats) of positional data
  48 bits=3-shorts (2-bytes each, half-sized quantized floats) of rotational (Euler) data=96 bits total The total is now 96 bits, or half of the prior value. For this particular game entity, there is no translation throughout its life, and the entity only rotates slowly on one axis. Compression can be considered using the delta bit marshaller, since the only thing changing is one element out of this six element transform, which corresponds to 83% non-usage. The programmer can use a delta bit marshaller API to declare the structure of the integers to represent. The programmer can indicate that the integers are three 16-bit integers and then another three 16-bit integers, with a delta size using only 8-bits (for each of them). If it turns out the delta is computed to not fit in the requested number of bits (e.g., 8), the full data (not the delta) can be stored using the full number of bits (e.g., 16), and this fact specified in the control bits for this integer entry.

Figure 5:
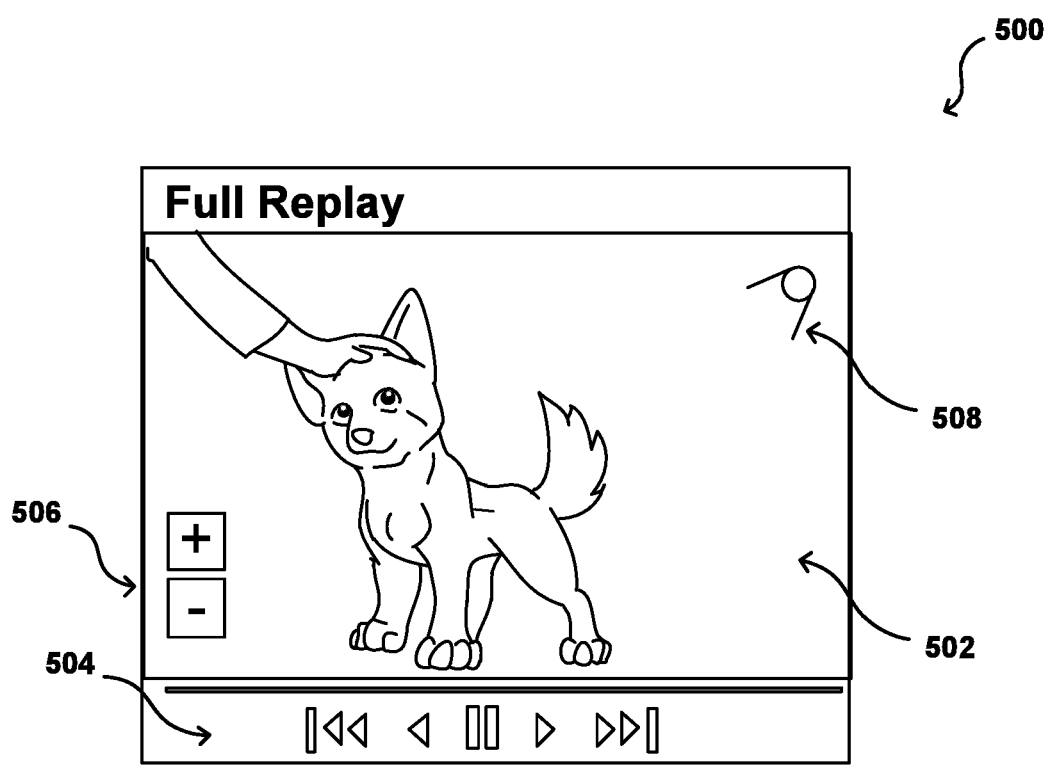
FIG. 5 illustrates an example instant replay interface that can be presented in accordance with various embodiments.

FIG. 5 illustrates an example replay interface 500 that can be generated in accordance with one embodiment. In this example, the state data has been used to render a replay of game content 502 for a game session. The interface can include various types of controls that can enable adjustment of the playback. For example, a set of playback controls 504 can enable a user to perform actions such as to pause, fast forward, or reverse the playback, as well as to adjust a playback speed or frame rate, among other such options. The interface also includes selectable zoom controls 506 that enable adjustment of the zoom level or field of view of the playback. The interface also includes a camera element 508 that a user can move in order to adjust a point of view of the rendering, although in some embodiments the camera position may be fixed or may move along a predetermined path, among other such options. In addition to the graphical input elements, it should be understood that there can be various controller options, voice inputs, gesture inputs, or other actions that can be used to obtain similar functionality for other replay interfaces or playback options.

Figure 6:
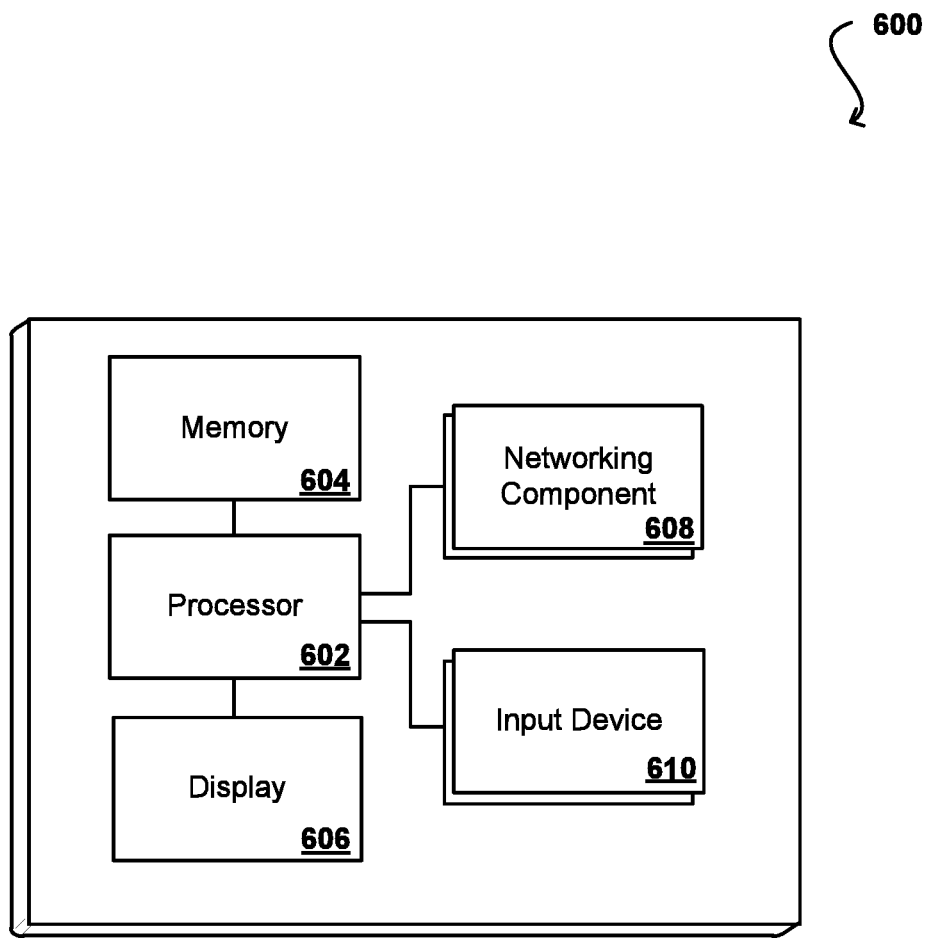
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
joining, by a player gaming device associated with a first player, a game session hosted by a gaming server, the game session involving a plurality of players using a plurality of respective gaming devices;
receiving, to the player gaming device, session data from the gaming server during the game session;
storing game state data for the game session to a circular buffer on the player gaming device, the game state data including the session data and player-specific data for the first player with respect to the game session;
determining to display a replay of a recent period of the game session;
causing elements for the game session to be hidden from display on the player gaming device;
rendering, as the replay on the player gaming device, gameplay data from the recent period using the game state data stored in the circular buffer;
causing the elements of the game session to be made visible for active gameplay after completion of the replay;
obtaining, after termination of the game session, a replay key associated with the game session from the gaming server; and
requesting replay game state data from the gaming server using the replay key.

2. The computer-implemented method of claim 1, further comprising:
adjusting at least one of a point of view or a field of view of a virtual camera for which the gameplay data is to be rendered on the player gaming device.

3. The computer-implemented method of claim 1, wherein the game state data includes at least one of entity transforms, skeletal bone poses, sound effects, visual effects, and game-specific event data.

4. The computer-implemented method of claim 1, further comprising:
receiving, after termination of the game session, a request for a full replay of the game session; and
causing at least a portion of the full replay to be rendered for display on the player gaming device using the replay game state data.

5. The computer-implemented method of claim 1, further comprising:
receiving player-provided information relating to the game session;
storing at least a portion of the player-provided information as metadata to the circular buffer; and
causing one or more graphical elements corresponding to the metadata to be rendered for display with the gameplay data during the replay.

6. The computer-implemented method of claim 5, further comprising:
transmitting the metadata to the gaming server to be stored with the session data, wherein a full replay to be rendered for display on the player gaming device is able to include the metadata with the replay game state data.

7. The computer-implemented method of claim 1, further comprising:
determining a maximum amount of game state data storable by the circular buffer based at least in part upon at least one of user input, game developer input, game requirements, or player gaming device capability.

8. The computer-implemented method of claim 1, further comprising:
providing playback controls for use in adjusting a playback of the gameplay data on the player gaming device, the playback controls capable of at least one of adjusting a playback speed, pausing the playback, reversing the playback, or marking the gameplay data with player metadata.

9. The computer-implemented method of claim 1, further comprising:
spawning new entities for the gameplay data to be made visible during the replay.

10. A non-transitory computer-readable storage medium including instructions that, when executed by at least one processor of a computer system, cause the computer system to:
join, associated with a first player, a game session hosted by a gaming server, the game session involving a plurality of players using a plurality of respective gaming devices;
receive session data from the gaming server during the game session;
store game state data for the data session to a circular buffer, the game state data including the session data and player-specific data for the first player with respect to the game session;
determine to display a replay of a recent period of the game session;
cause elements for the game session to be hidden from display on the player gaming device;
render, as the replay on the player gaming device, gameplay data from the recent period using the game state data stored in the circular buffer;
cause the elements of the game session to be made visible for active gameplay after completion of the replay;
obtain, after termination of the game session, a replay key associated with the game session from the gaming server; and
request replay game state data from the gaming server using the replay key.

11. The non-transitory computer-readable storage medium of claim 10, wherein the instructions when executed further cause the computer system to:
adjust at least one of a point of view or a field of view of a virtual camera for which the gameplay data is to be rendered on the player gaming device.

12. The non-transitory computer-readable storage medium of claim 10, wherein the instructions when executed further cause the computer system to:
receive, after termination of the game session, a request for a full replay of the game session; and
cause at least a portion of the full replay to be rendered for display using the replay game state data.

13. The non-transitory computer-readable storage medium of claim 12, wherein the instructions when executed further cause the computer system to:
receive player-provided information relating to the game session;
store at least a portion of the player-provided information as metadata to the circular buffer;
cause one or more graphical elements corresponding to the metadata to be rendered for display with the gameplay data during the replay; and
transmit the metadata to the gaming server to be stored with the session data, wherein a full replay to be rendered for display on the player gaming device is able to include the metadata with the replay game state data.

14. The non-transitory computer-readable storage medium of claim 10, wherein the instructions when executed further cause the computer system to:
compress at least a portion of the game state data using a bit marshalling algorithm.

15. The non-transitory computer-readable storage medium of claim 10, wherein the instructions when executed further cause the computer system to:
provide playback controls for use in adjusting a playback of the gameplay data on the player gaming device, the playback controls capable of at least one of adjusting a playback speed, pausing the playback, reversing the playback, or recording the playback.

16. A system, comprising:
at least one device processor;
memory including instructions that, when executed by the at least one device processor, cause the system to:
join, associated with a first player, a game session hosted by a gaming server, the game session involving a plurality of players using a plurality of respective gaming devices;
receive session data from the gaming server during the game session;
store game state data for the data session to a circular buffer, the game state data including the session data and player-specific data for the first player with respect to the game session;
determine to display a replay of a recent period of the game session;
cause elements for the game session to be hidden from display on the player gaming device;

render, as the replay on the player gaming device, gameplay data from the recent period using the game state data stored in the circular buffer;

cause the elements of the game session to be made visible for active gameplay after completion of the replay;

obtain, after termination of the game session, a replay key associated with the game session from the gaming server; and request replay game state data from the gaming server using the replay key.

17. The system of claim 16, wherein the instructions, when executed further cause the system to:

adjust at least one of a point of view or a field of view of a virtual camera for which the gameplay data is to be rendered on the player gaming device.

18. The system of claim 16, wherein the instructions, when executed further cause the system to:

receive, after termination of the game session, a request for a full replay of the game session; and cause at least a portion of the full replay to be rendered for display using the replay game state data.

19. The system of claim 18, wherein the instructions, when executed further cause the system to:

receive player-provided information relating to the game session;

store at least a portion of the player-provided information as metadata to the circular buffer;

cause one or more graphical elements corresponding to the metadata to be rendered for display with the gameplay data during the replay; and transmit the metadata to the gaming server to be stored with the session data, wherein a full replay to be rendered for display on the player gaming device is able to include the metadata with the replay game state data.

20. The system of claim 16, wherein the instructions, when executed further cause the system to:

compress at least a portion of the game state data using a bit marshalling algorithm.

* * * * *